US009170837B2

(12) United States Patent
Sukenari (10) Patent No.: US 9,170,837 B2
(45) Date of Patent: Oct. 27, 2015

(54) TRANSACTION CONCURRENT EXECUTION CONTROL SYSTEM, METHOD AND PROGRAM FOR CARRYING OUT A CONTROL OF CONCURRENTLY EXECUTING A TRANSACTION, INCLUDING MEASURING EXECUTION TIME FROM STARTING TO ENDING OF TRANSACTION EXECUTION

(75) Inventor: Teruki Sukenari, Tokyo (JP)

(73) Assignee: NEC CORPORATION, Tokyo (JP)

( * ) Notice: Subject to any disclaimer, the term of this patent is extended or adjusted under 35 U.S.C. 154(b) by 245 days.

(21) Appl. No.: 13/553,765

(22) Filed: Jul. 19, 2012

(65) Prior Publication Data

US 2013/0055269 A1    Feb. 28, 2013

(30) Foreign Application Priority Data

Aug. 25, 2011    (JP) ................................. 2011-183876

(51) Int. Cl.
     *G06F 9/46*        (2006.01)
     *G06F 11/14*      (2006.01)

(52) U.S. Cl.
     CPC ............ *G06F 9/467* (2013.01); *G06F 11/1474* (2013.01)

(58) Field of Classification Search
     CPC ................................ G06F 9/466; G06F 9/467
     USPC ......................................................... 718/101
     See application file for complete search history.

(56) References Cited

U.S. PATENT DOCUMENTS

| | | | | |
|---|---|---|---|---|
| 5,572,546 | A * | 11/1996 | Serfaty et al. | 375/221 |
| 8,156,275 | B2 * | 4/2012 | de Cesare et al. | 710/200 |
| 2004/0015510 | A1 | 1/2004 | Moir et al. | |
| 2005/0028147 | A1 * | 2/2005 | Bonilla | 717/138 |
| 2007/0162427 | A1 * | 7/2007 | Yamaoka | 707/2 |
| 2008/0034369 | A1 * | 2/2008 | Polizzi et al. | 718/102 |
| 2009/0172674 | A1 * | 7/2009 | Bobak et al. | 718/101 |
| 2009/0193206 | A1 * | 7/2009 | Ishii et al. | 711/162 |
| 2011/0107338 | A1 | 5/2011 | Ylonen | |
| 2011/0258639 | A1 * | 10/2011 | Walsky et al. | 719/316 |
| 2012/0089991 | A1 * | 4/2012 | Scheerer et al. | 719/318 |
| 2012/0239525 | A1 * | 9/2012 | Zeng et al. | 705/26.8 |

FOREIGN PATENT DOCUMENTS

| | | |
|---|---|---|
| JP | 10-27122 A | 1/1998 |
| JP | 11-234269 A | 8/1999 |

OTHER PUBLICATIONS

Japanese Office Action dated Feb. 13, 2015 with English Translation.
Masamichi Eto el.al, "Efficient Rollback for LogTM by Selecting Appropriate Conflict Levels", IPSJ SIG Technical Report 2011 (in fiscal Heisei 23), Japan, Information Processing Society of Japan Aug. 15, 2011, [CD-ROM] 2, vol. 2011-ARC-196-No. 22.

* cited by examiner

*Primary Examiner* — Emerson Puente
*Assistant Examiner* — Charlie Sun
(74) *Attorney, Agent, or Firm* — McGinn IP Law Group, PLLC.

(57) ABSTRACT

A transaction concurrent execution control system carries out a control of concurrently executing a transaction. The transaction concurrent execution control system includes a transaction execution unit for executing the transaction, a back-off time determination unit for determining a waiting time until the transaction is re-executed when a commitment of the transaction has failed, and a transaction pooling unit for causing the transaction to stand by for re-execution until the waiting time has elapsed when the commitment of the transaction has failed.

6 Claims, 9 Drawing Sheets

TABLE.X

| PK | COL1 | COL2 | COL3 |
|---|---|---|---|
| 1 | 11a | 12a | 13a |
| 2 | 21a | 22a | 23a |

FIG. 4

```
TX1.START;
  UPDATE TABLE.X SET COL1=11b WHERE PK=1;
  UPDATE TABLE.X SET COL1=21b WHERE PK=2;
TX1.COMMIT;
```

FIG. 5

```
TX2.START;
   UPDATE TABLE.X SET COL1=11c WHERE PK=1;
TX2.COMMIT;
```

| PRIORITY (p) | TIME INTERVAL int (p) |
|---|---|
| HIGH | 10 |
| MIDDLE | 50 |
| LOW | 100 |

TRANSACTION CONCURRENT EXECUTION CONTROL SYSTEM, METHOD AND PROGRAM FOR CARRYING OUT A CONTROL OF CONCURRENTLY EXECUTING A TRANSACTION, INCLUDING MEASURING EXECUTION TIME FROM STARTING TO ENDING OF TRANSACTION EXECUTION

This application is based upon and claims the benefit of priority from Japanese patent application No. 2011-1833876, filed on Aug. 25, 2011 the disclosure of which is incorporated herein in its entirety by reference.

TECHNICAL FIELD

The present invention relates to transaction concurrent execution control systems, transaction concurrent execution control methods, and programs therefor.

BACKGROUND ART

As a transaction concurrent execution control method of relational database, the concurrent execution control based on a pessimistic lock (an exclusive control mechanism) is known. In the concurrent execution control based on a pessimistic lock, a transaction TX1 locks all records to be referred to and updated beforehand, while another transaction TX2 to be concurrently executed stands by until the lock is released. By virtue of this, the transaction TX1 can ensure the atomicity (whether the whole transaction fails or succeeds).

However, if a pessimistic lock is used in a WEB system accessed for reference by a large number of users for example, then delay in user response may arise from the standby state, deadlock state, protocol overhead, and the like. Therefore, WEB systems which adopt the transaction concurrent execution control based on an optimistic lock are increasing in recent years.

In an optimistic lock (CAS: Compare And Swap), for example, an application acquires a record R1 to be updated and its version number R1_V1 from a perpetuation device (storage) before starting the transaction TX1. Further, the application updates the record R1 on a process memory, and increments the version number to R1_V2. Then, the application writes the updated record R1 and the version number R1_V2 into the storage. The storage compares (Compare) the "inputted version number R1_V2" with the "version number of record R1". If the version number of record R1 remains the same as R1_V1, then it writes (Swap) the record R1 and the version number R1_V2 into itself, whereby the commitment succeeds. Otherwise, the other transaction TX2 aborts after determining that the record R1 is updated, whereby the commitment fails.

Because the optimistic lock does not need any lock mechanism and transaction management mechanism (TP monitors and the like), there is a merit that the transaction concurrent execution control system becomes a simple implement. Further, because a commitment success or failure is determined at the time of finally writing the record and the like into the perpetuation device, a plurality of transactions can concurrently access the same record for reference, thereby greatly improving the processing throughput of a user reference request in WEB systems.

The following Nonpatent Document 1 discloses an example of the transaction concurrent execution control system using an optimistic lock. The transaction concurrent execution system Voldemort disclosed in the Nonpatent Document 1 uses a Berkley DB as the storage. The Vodermort updates a data in its own memory space after acquiring the data to be updated inside of the transaction received from a client application, and the version number of the data. Then, at the time of writing the updated data into the Berkley DB, it determines whether or not the version number of the update data matches the acquired version number. If they are matched, then it writes, into the Berkley DB, the update data with a new version number having incremented the acquired version number. It is regarded as a commitment success when the writing is completed. If the version numbers are not matched, then it is regarded as a commitment failure.

[Nonpatent Document 1] "Project Voldemort", <http://project-voldemort.com/>, 2011 May 31

However, in the concurrent execution control system of Nonpatent Document 1, if the number of concurrently executed transactions increases, then there is a problem of wasting the machine resource. The reason is that a transaction does not know whether or not the commitment of another concurrently executed transaction succeeds, and thus the former transaction consumes the machine resource until its own commitment fails.

SUMMARY

Accordingly, one exemplary object of the present invention is to provide a transaction concurrent execution control system capable of restraining the consumption of machine resource from rising in spite of increasing in the number of concurrently executed transactions.

An aspect in accordance with the present invention provides a transaction concurrent execution control system carrying out a control of concurrently executing a transaction, the system including: a transaction execution portion executing the transaction; a back-off time determination portion determining a waiting time until the transaction is re-executed when a commitment of the transaction has failed; and a transaction pooling portion causing the transaction to stand by for re-execution until the waiting time has elapsed when the commitment of the transaction has failed.

Another aspect in accordance with the present invention provides a transaction concurrent execution control method for carrying out a control of concurrently executing a transaction, the method comprising the processes of: executing the transaction; determining a waiting time until the transaction is re-executed when a commitment of the transaction has failed; and causing the transaction to stand by for re-execution until the waiting time has elapsed when the commitment of the transaction has failed.

Still another aspect in accordance with the present invention provides a computer-readable medium storing a program comprising instructions for causing a computer to function as a transaction concurrent execution control device carrying out a control of concurrently executing a transaction, the program causing the compute to function as: a transaction execution portion executing the transaction; a back-off time determination portion determining a waiting time until the transaction is re-executed when a commitment of the transaction has failed; and a transaction pooling portion causing the transaction to stand by for re-execution until the waiting time has elapsed when the commitment of the transaction has failed.

According to the present invention, it is possible to restrain the consumption of machine resource from rising in spite of increasing in the number of concurrently executed transactions.

EXEMPLARY EMBODIMENTS

A First Exemplary Embodiment

Next, referring to the accompanying drawings, a first example for embodying the present invention will be explained in detail.

Figure 1:
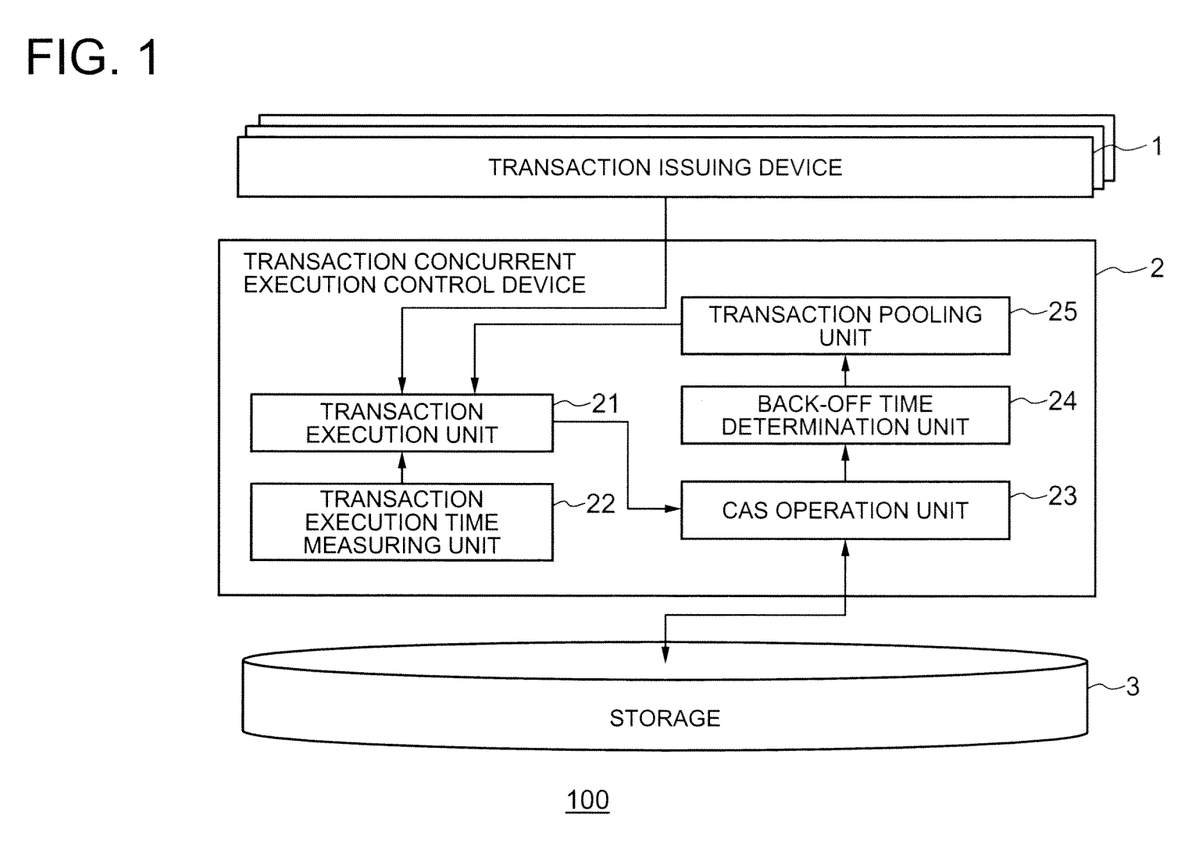
FIG. 1 is a block diagram showing a configuration of a transaction concurrent execution control system in accordance with a first exemplary embodiment of the present invention.

FIG. 1 is a block diagram showing a configuration of a transaction concurrent execution control system 100 in accordance with a first exemplary embodiment of the present invention. As shown in the figure, the transaction concurrent execution control system 100 includes a transaction issuing device 1, a transaction concurrent execution control device 2, and a storage 3 (a perpetuation device).

The transaction issuing device 1 is a device sending transactions to the transaction concurrent execution control device 2, and can adopt a dedicated or general-purpose computer provided with a CPU, memories such as ROM, RAM and the like, an external storage device for various types of information, an input interface, an output interface, a communication interface, and a bus connecting those components. There may as well be more than one transaction issuing device 1.

The transaction concurrent execution control device 2 is a device carrying out a concurrent execution control of the transactions received from the transaction issuing device 1, and can also adopt a dedicated or general-purpose computer provided with a CPU, memories such as ROM, RAM and the like, an external storage device for storing various types of information, an input interface, an output interface, a communication interface, and a bus connecting those components. There may as well be more than one transaction concurrent execution control device 2. Further, the transaction concurrent execution control device 2 may be configured either by a single computer or by a plurality of computers connected with each other via communication lines.

The transaction concurrent execution control device 2 includes a transaction execution unit 21, a transaction execution time measuring unit 22, a CAS operation unit 23, a back-off time determination unit 24, and a transaction pooling unit 25. The transaction execution unit 21, transaction execution time measuring unit 22, CAS operation unit 23, back-off time determination unit 24, and transaction pooling unit respond to functional modules realized by executing a predetermined program stored by the CPU into the ROM and the like.

The transaction execution unit 21 analyzes the transaction received from the transaction issuing device 1, and determines an execution plan for the transaction.

The transaction execution time measuring unit 22 measures the period of time from transaction execution unit 21 starting the executing of the transaction to the ending of the execution (commitment success or failure).

The CAS operation unit 23 carries out a CAS operation when the transaction execution unit 21 carries out the execution plan to finally reflect the data to the storage 3.

The back-off time determination unit 24 calculates a waiting time (a back-off time) until the transaction is re-executed, based on the transaction execution time measured by the transaction execution time measuring unit 22, if the CAS operation unit 23 has determined a commitment failure of the transaction.

The transaction pooling unit 25 controls the transaction to stand by for re-execution until the back-off time calculated by the back-off time determination unit 24 has elapsed.

The storage 3 is implemented by a storage device.

Next, the operation of the transaction concurrent execution control system 100 will be explained.

Figure 2:
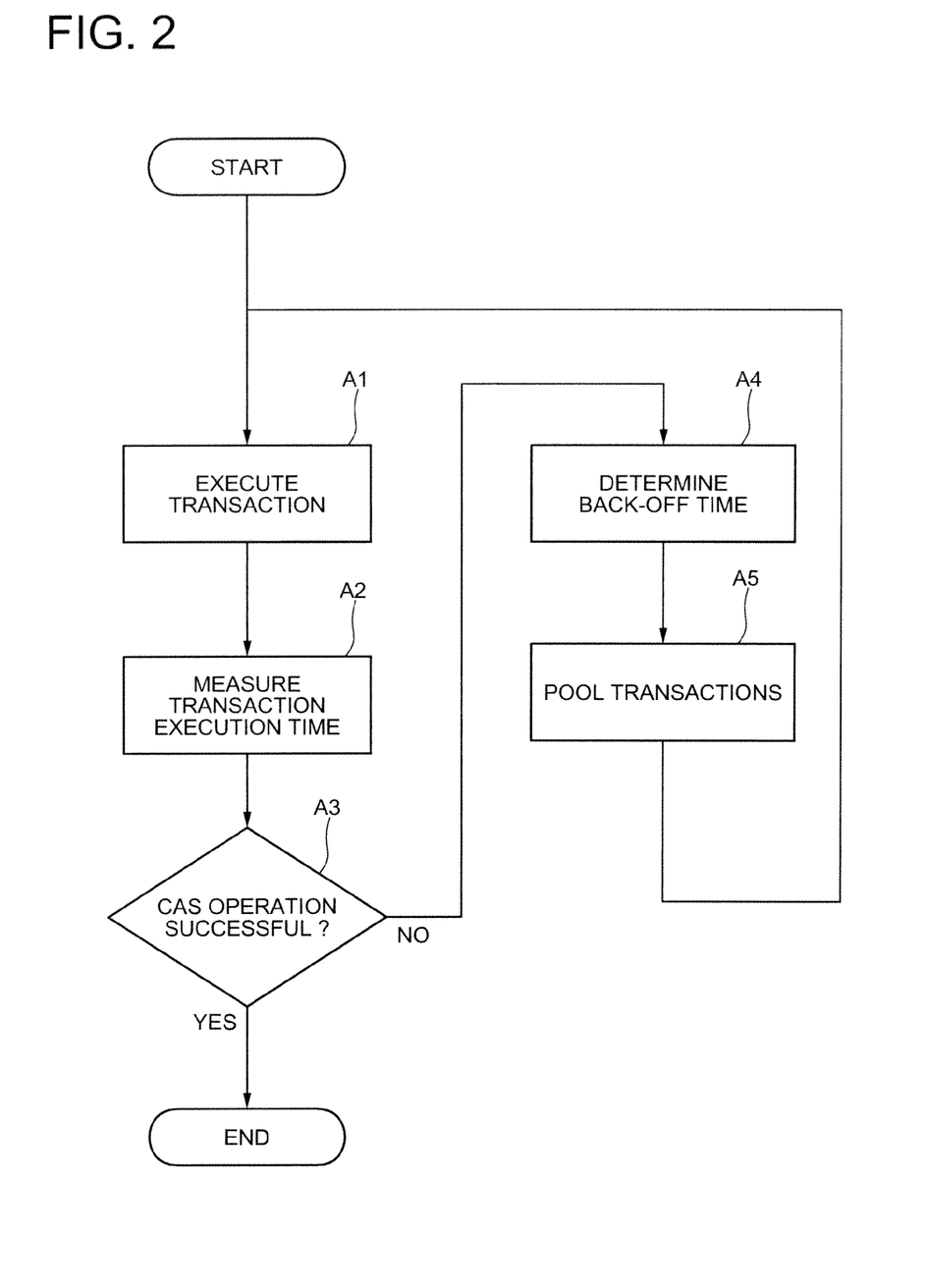
FIG. 2 is a flowchart of operation of the transaction concurrent execution control system in accordance with the first exemplary embodiment of the present invention.

FIG. 2 is a flowchart of the operation of the transaction concurrent execution control system 100.

On receiving a transaction from the transaction issuing device 1, the transaction concurrent execution control device 2 executes the transaction according to the plan generated by the transaction execution unit 21 (step A1).

The transaction execution time measuring unit 22 measures the execution time for each transaction executed in the step A1, and stores the same into a memory and the like (step A2).

The CAS operation unit 23 carries out a CAS operation when reflecting a resultant data of executing the transaction to the storage 3 (step A3). If the CAS operation is successful (step A3: YES), then the process is ended with a commitment success.

On the other hand, if the CAS operation is unsuccessful (step A3: NO), then a commitment failure is determined, and the back-off time determination unit 24 calculates the back-off time (step A4). If the commitment failure is made for the first time, then the back-off time is determined based on a window size determined from a random value, and a preset time slot. On the other hand, if the commitment failure is made twice or more, then the back-off time is taken to be the value of subtracting the transaction execution time measured in the step A2 from the back-off time determined at the first commitment failure.

The transaction pooling unit 25 causes the transaction to stand by for re-execution until the back-off time determined in the step A4 has elapsed (step A5). Thereafter, the process returns to the step A1 to re-execute the transaction.

Next, using a specific example, explanations will be made with respect to the operation of the transaction concurrent execution control system 100 in accordance with the first exemplary embodiment.

The transaction issuing device 1 is realized by a WEB server, an application server, and the like. The transaction concurrent execution control device 2 is realized by a database management system, a Key-Value-Store (Voldemort, HBase, kumofs, and the like). The storage 3 is realized either by an Inno DB and the like in the case of DBMS (MySQL) or by a Berkley DB and the like in the case of KVS (Voldemort).

Figure 3:
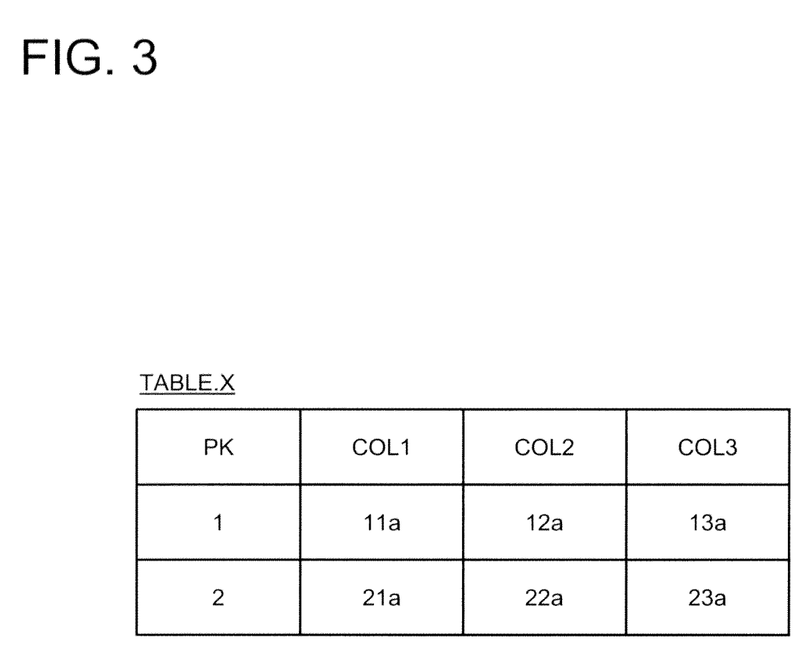
FIG. 3 shows an example of table stored in a storage in accordance with the first exemplary embodiment of the present invention.

The storage 3 is assumed to store a table X in accordance with the data schema shown in FIG. 3. The table X is configured by a primary key (PK) and three columns (COL1, COL2, and COL3), and has two records (PK=1, 2).

Figure 4:
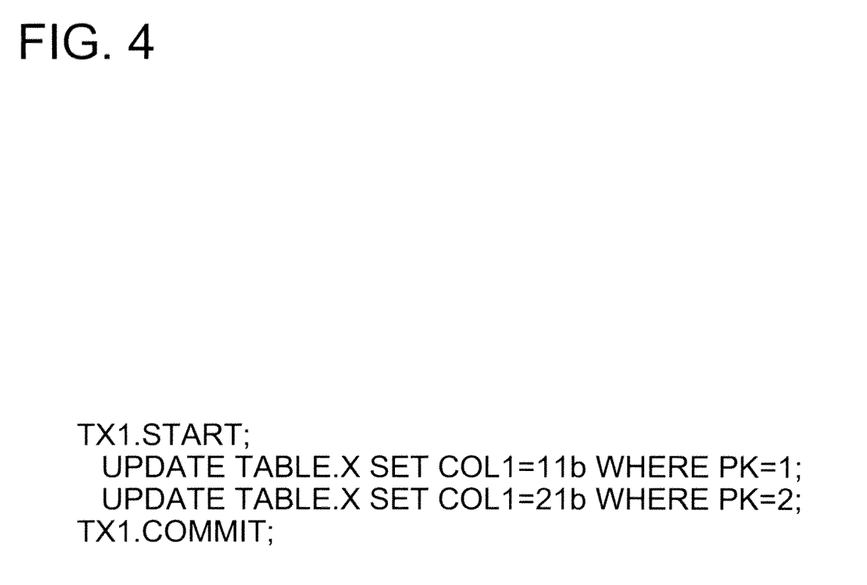
FIG. 4 shows an example of content of a transaction in accordance with the first exemplary embodiment of the present invention.

The transaction issuing device 1 sends the transaction TX1 shown in FIG. 4 to the transaction concurrent execution control device 2. The transaction TX1 serves to atomically change each of the COL1 value of the two records with PK=1, 2 in the table X.

Here, the transaction concurrent execution control device 2 is assumed to be able to atomically carry out a series of data update processes inside of the transaction by using the CAS operation based on an optimistic lock. As the transaction concurrent execution control device 2 with such assumption being established, there is a KVS such as Voldemort, HBase, kumofs, and the like. The KVS lets the storage 3 save all the data to be updated inside of the transaction (the records with PK=1, 2 the transaction TX1 shown in FIG. 4) to which a single version number (supposed to be V1) is assigned. Then, at the time of committing the transaction TX1, the version number of the two records is acquired from the storage 3 again (supposed to be V2), to determine whether or not V1 matches V2 (a Compare process of the CAS operation). If they are matched, then the commitment is regarded as successful; thus, the update data along with the value V3 having incremented the version number V1 (PK=1, 2) are written into the storage 3 (a Swap process of the CAS operation). On the other hand, if they are not matched, then the commitment is regarded as unsuccessful.

Figure 5:
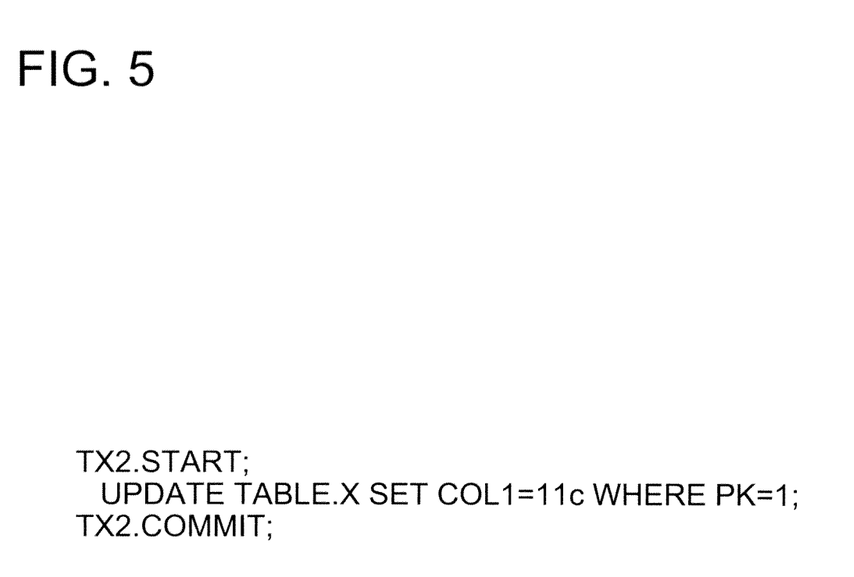
FIG. 5 shows an example of content of another transaction in accordance with the first exemplary embodiment of the present invention.

In concurrence with the transaction TX1 the transaction issuing device 1 sends the transaction TX2 shown in FIG. 5 to the transaction concurrent execution control device 2. The transaction TX2 serves to atomically change the COL1 value of the record with PK=1 in the table X. Because the same record (PK=1) is updated inside of the transaction with respect to TX1 and TX2, the same version number V (PK=1, 2) is used to carry out the CAS operation.

Figure 6:
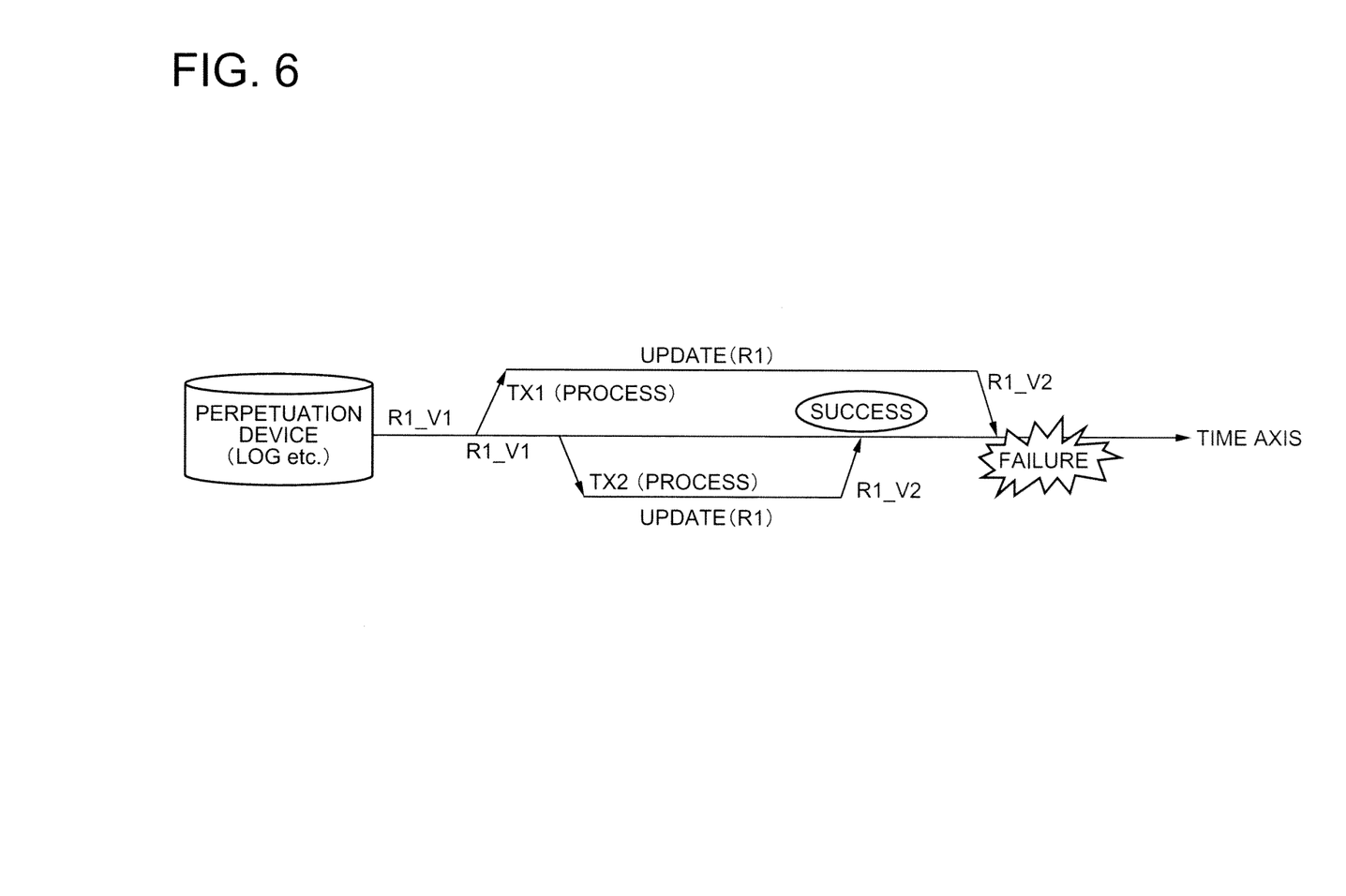
FIG. 6 shows an example of concurrently executing transactions.

For example, if the transaction TX1 and transaction TX2 are executed in the order of transaction start and end as shown in FIG. 6, then the transaction TX1 fails in the CAS operation, and thus the commitment is unsuccessful. Therefore, the transaction execution time measuring unit 22 measures the period of time of executing the transactions TX1 and TX2.

If the CAS operation unit 23 determines that the transaction TX2 fails in the CAS operation and thus the commitment is unsuccessful, then the back-off time determination unit 24 starts the calculation of the back-off time. The back-off time determination unit 24 generates a random value (to be referred to as rand or window size; see Formula 1) existing between a preset lower limit value (rand_min) and a preset upper limit value (rand_max).

$$\text{rand\_min} < \text{rand} < \text{rand\_max} \quad \text{(Formula 1)}$$

Next, the back-off time determination unit 24 determines the back-off time (T_bo; see Formula 2) to be the value of multiplying the window size (rand) by a preset time slot (slot).

$$T\_bo = \text{rand} \times \text{slot} \quad \text{(Formula 2)}$$

The transaction pooling unit 25 causes the transaction TX2 in commitment failure (the first time) to stand by (pool) for re-execution until the back-off time T_bo (TX2) of the transaction TX2 has elapsed. Further, after the back-off time T_bo (TX2) of the transaction TX2 has elapsed, the transaction TX2 is inputted to the transaction execution unit 21 to be re-executed.

Next, explanations will be made with respect to a method for determining the back-off time if the re-executed transaction TX2 fails in commitment again (twice or more). The back-off time determination unit 24 adjusts the back-off time according to the number of commitment failures of the transaction TX2. In particular, it takes a new back-off time to be the value of subtracting the execution time of the transaction TX2 at the commitment failure (of the second time) from the back-off time T_bo (TX2) determined at the commitment failure (of the first time). That is, each time the commitment failure is repeated, the back-off time is subtracted by the transaction execution time, and finally the transaction is re-executed without waiting time.

In the above manner, according to the first exemplary embodiment, when the optimistic lock (CAS) fails, because the transaction stands by for re-execution until the back-off time calculated based on a random value has elapsed, it is possible to stochastically disperse the timing of executing a plurality of transactions to be concurrently executed. Thereby, re-collision can be avoided between those transactions. Therefore, it is possible to restrain the consumption of machine resource from rising in spite of increasing in the number of concurrently executed transactions.

Further, when the CAS fails twice or more, because the back-off time is taken to be the value of subtracting the transaction execution time from the back-off time determined at the previous CAS failure, the back-off time becomes shorter as the number of the CAS failures increases. Thereby, it is possible to prevent the occurring of transactions which can never succeed in commitment. Especially, if the execution time of another transaction to be concurrently executed is shorter than its own, then since there is no interval allowed for exclusive execution, it is easy to give rise to such an event as commitment cannot succeed over a long period of time. Therefore, it is desirable to shorten the back-off time at each time of re-execution as in the first exemplary embodiment.

A Second Exemplary Embodiment

Figure 7:
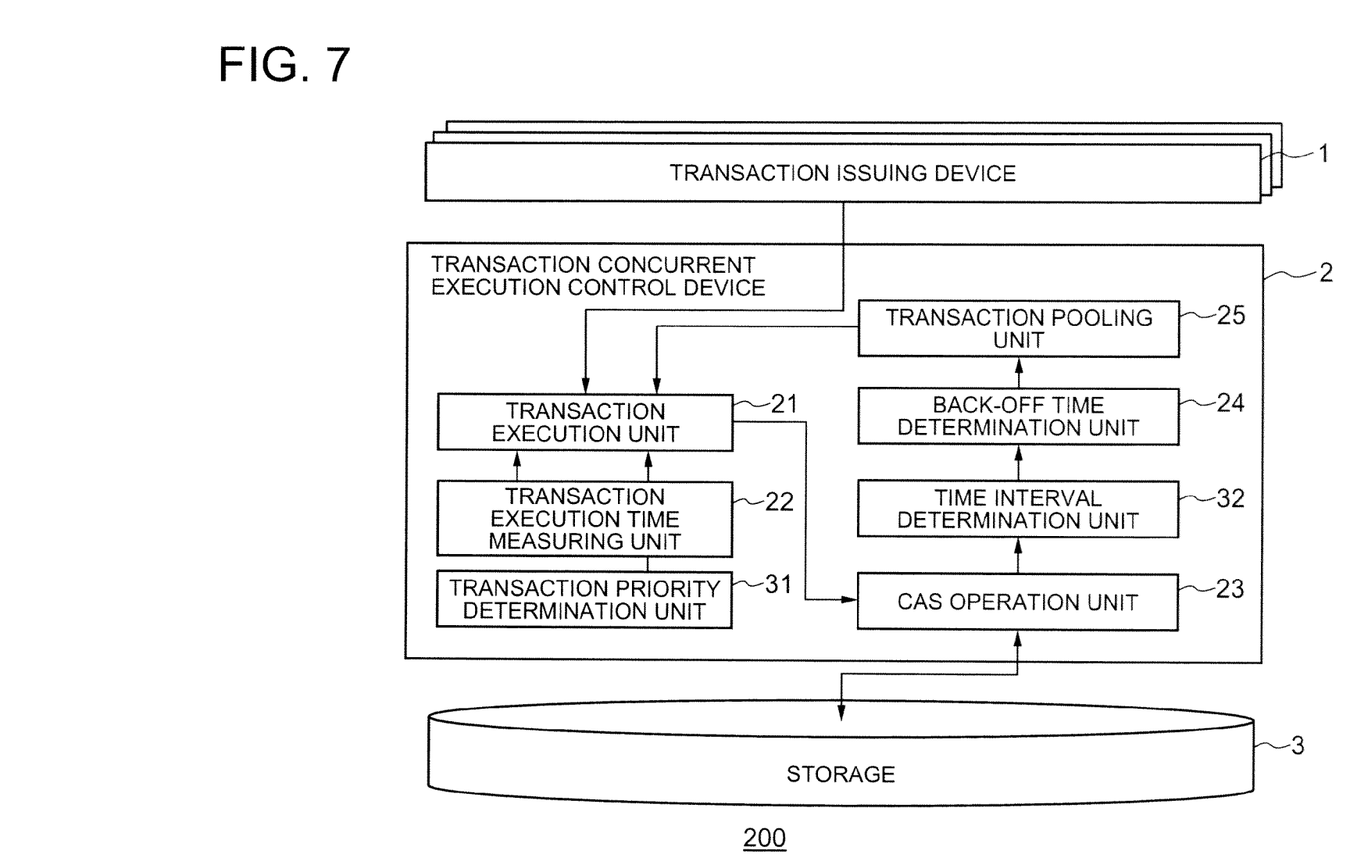
FIG. 7 is a block diagram showing a configuration of a transaction concurrent execution control system in accordance with a second exemplary embodiment of the present invention.

FIG. 7 is a block diagram showing a configuration of a transaction concurrent execution control system 200 in accordance with a second exemplary embodiment of the present invention. The same reference numerals as used in FIG. 1 denote identical or equivalent components. As shown FIG. 7, the transaction concurrent execution control system 200 in accordance with the second exemplary embodiment includes a transaction priority determination unit 31 and a time interval determination unit 32 in addition to the components configured in the first exemplary embodiment.

In the first exemplary embodiment, the back-off time determination unit 24 randomly determines the back-off time by using a random value (window size). In the second exemplary embodiment, however, the back-off time is determined based on a transaction execution priority set by the transaction issuing device 1 or the transaction concurrent execution control device 2.

The transaction priority determination unit 31 determines the execution priority for each transaction. The time interval determination unit 32 determines a fixed-length time interval based on the execution priority determined by the transaction priority determination unit 31.

The back-off time determination unit 24 determines the back-off time by using the time interval determined by the time interval determination unit 32.

Next, the operation of the transaction concurrent execution control system 200 will be explained.

Figure 8:
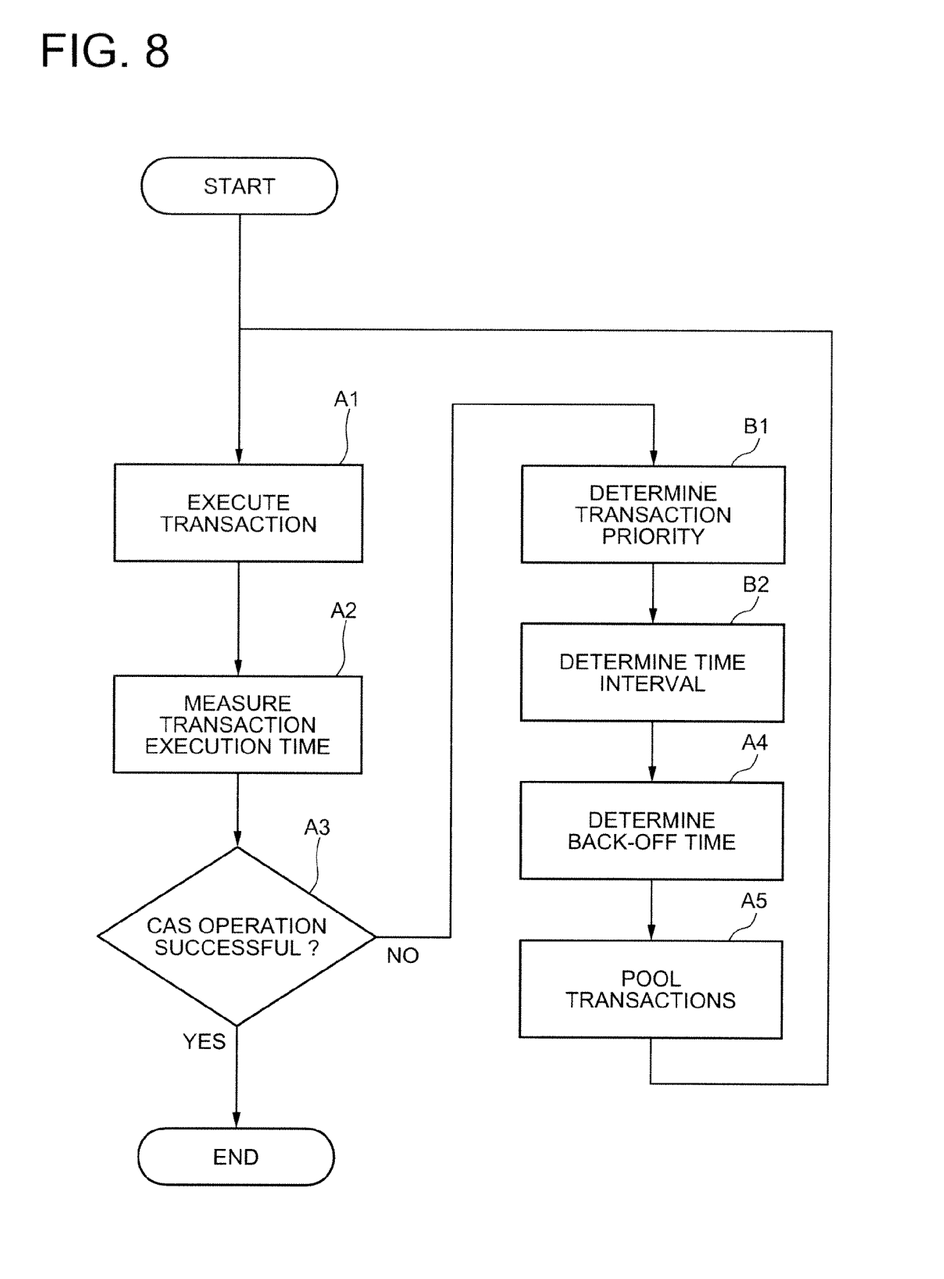
FIG. 8 is a flowchart of operation of the transaction concurrent execution control system in accordance with the second exemplary embodiment of the present invention.

FIG. 8 is a flowchart of operation of the transaction concurrent execution control system 200. The operations of the steps A1 to A3 are the same as those in the first exemplary embodiment.

The transaction priority determination unit 31 determines the priority for each transaction based on the priority for each transaction sent by the transaction issuing device 1 to the transaction concurrent execution control device 2. Alternatively, the transaction priority determination unit 31 may determine the priority for each transaction according to a preset rule for determining the priority (step B1).

The time interval determination unit 32 collates the priority determined by the transaction priority determination unit 31 with a preset time interval map, and determines the time interval applying to the transaction (step B2).

The back-off time determination unit 24 determines the back-off time by using the time interval determined by the time interval determination unit 32, a contention window, and a time slot (step A4).

The transaction pooling unit 25 causes the transaction to stand by for re-execution until the back-off time determined in the step A4 has elapsed (step A5). Thereafter, the process returns to the step A1 to re-execute the transaction.

Next, using a specific example, explanations will be made with respect to the operation of the transaction concurrent execution control system 200 in accordance with the second exemplary embodiment.

The transaction priority determination unit 31 of the transaction concurrent execution control device 2 acquires the priority designated by the transaction issuing device 1 for each transaction (HIGH, MIDDLE, or LOW, for example).

Further, the transaction priority determination unit 31 may determine the priority by itself for each transaction according to the preset rule for determining the priority. The rule for determining the priority can be considered to be a method for determining the priority HIGH, MIDDLE, or LOW according to, for example, the size of the data to be updated inside of the transaction (the number of table records, and the like). In a large-scale transaction inside of which many records are updated, because many other small-scale transactions overlap many of the records to be updated, it is highly possible to induce a commitment failure of its own or other transactions. Therefore, it is possible to prevent the commitment failure of its own and other transactions by determining the priority for a large-scale transaction to be HIGH so as to execute the transaction immediately.

Figure 9:
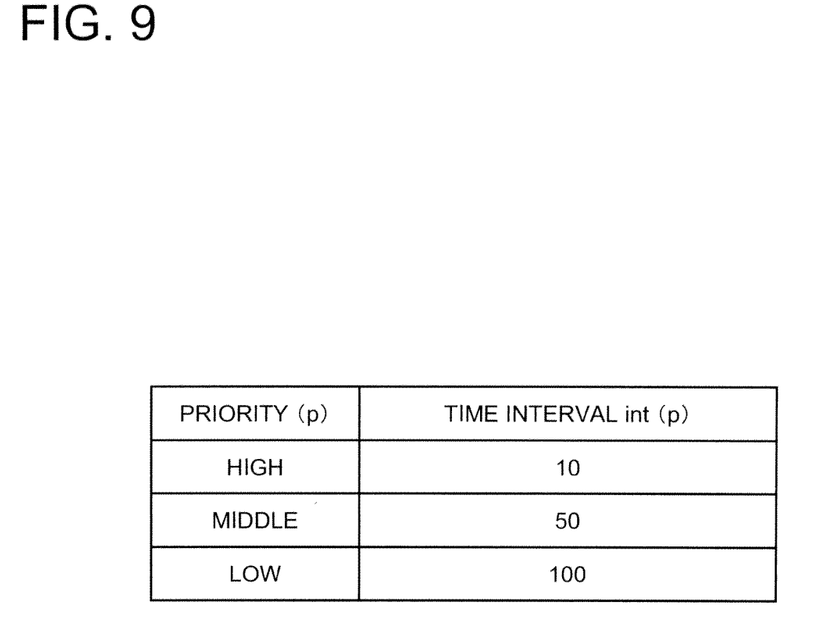
FIG. 9 shows an example of a time interval map indicating a corresponding relationship between a transaction execution priority and a time interval in accordance with the second exemplary embodiment of the present invention.

The time interval determination unit 32 determines the time interval for each transaction by using the time interval map indicating a corresponding relationship between a transaction execution priority (p) and a time interval (int (p)) as shown in FIG. 9 for example.

The back-off time determination unit 24 calculates, as the back-off time, the value of adding the time interval to the back-off time used in the first exemplary embodiment (Formula 3).

$$T\_bo = \text{int}(p) + \text{rand} \times \text{slot} \quad \text{(Formula 3)}$$

In the above manner, according to the second exemplary embodiment, because the back-off time up to re-execution of the transaction when the CAS fails, is adjusted according to the priority of executing the transaction, it is possible to guarantee the service quality setting the priority for each transaction.

The whole or part of the exemplary embodiments disclosed above may also be described as, but not limited to, the following supplementary notes.

(Supplementary Note 1)

A transaction concurrent execution control system carrying out a control of concurrently executing a transaction, the system comprising:

a transaction execution portion executing the transaction;

a back-off time determination portion calculating a waiting time until the transaction is re-executed when a commitment of the transaction has failed; and a transaction pooling portion causing the transaction and by for re-execution until the waiting time has elapsed when the commitment of the transaction has failed.

(Supplementary Note 2)

The transaction concurrent execution control system according to Supplementary Note 1, wherein the back-off time determination portion calculates the waiting time until the transaction is re-executed by using a random value between a predetermined upper limit value and a predetermined lower limit value.

(Supplementary Note 3)

The transaction concurrent execution control system according to Supplementary Note 1 or 2 further comprising a transaction execution time measuring portion measuring an execution time from the starting of a transaction execution to the ending of the same by the transaction execution portion, wherein the back-off time determination portion takes a waiting time until the next re-execution to be a value of subtracting the execution time from the waiting time calculated at a previous time, when the commitment of re-executing the transaction has failed.

(Supplementary Note 4)

The transaction concurrent execution control system according to any of Supplementary Notes 1 to 3 further comprising:

a transaction priority determination portion determining an execution priority of the transaction; and a time interval determination portion determining a time interval up to re-execution of the transaction based on the execution priority, wherein the back-off time determination portion adjusts the waiting time until the transaction is re-executed by using the time interval.

(Supplementary Note 5)

The transaction concurrent execution control system according to Supplementary Note 4, wherein the back-off time determination portion takes a waiting time until the next re-execution to be the value of adding the time interval to the waiting time calculated at the previous time, when the commitment of re-executing the transaction has failed.

(Supplementary Note 6)

The transaction concurrent execution control system according to any of Supplementary Notes 1 to 5, wherein the control of concurrently executing the transaction is based on an optimistic lock.

(Supplementary Note 7)

A transaction concurrent execution control method for carrying out a control of concurrently executing a transaction, the method comprising the processes of:

executing the transaction;

calculating a waiting time until the transaction executed when a commitment the transaction has failed; and causing the transaction to stand by for re-execution until the waiting time has elapsed when the commitment of the transaction has failed.

(Supplementary Note 8)

A program comprising instructions for causing a computer to function as a transaction concurrent execution control device carrying out a control of concurrently executing a transaction, the program causing the computer to function as:
a transaction execution portion executing the transaction;
a back-off time determination portion calculating a waiting time until the transaction is re-executed when a commitment of the transaction has failed; and
a transaction pooling portion causing the transaction to stand by for re-execution until the waiting time has elapsed when the commitment of the transaction has failed.

The present invention can be applied to transaction concurrent execution control systems in a large-scale WEB portal site providing services such as SNS (Social Network Service), EC (Electronic Commerce) and the like, transaction concurrent execution control programs to realize a large-scale WEB portal site by computers, etc.

The invention claimed is:

1. A transaction concurrent execution control system carrying out a control of concurrently executing a transaction, the system comprising:
a processor on a computer; and
a non-transitory computer storage device, said storage device storing instructions for said processor to run:
a transaction execution portion executing the transaction;
a back-off time determination portion determining a first waiting time until the transaction is re-executed when a commitment of the transaction has failed;
a transaction pooling portion causing the transaction to stand by for re-execution until the first waiting time has elapsed when the commitment of the transaction has failed, wherein the control of concurrently executing the transaction is based on an optimistic lock; and
a transaction execution time measuring portion measuring an execution time from a starting of a transaction execution to an ending of the transaction execution by the transaction execution time measuring portion,
wherein the back-off time determination portion determines the first waiting time, wherein the first waiting time is a time until the transaction is re-executed at a next time and is a value of subtracting the execution time from a second waiting time calculated at a previous time, when a commitment of re-executing the transaction has failed.

2. The transaction concurrent execution control system according to claim 1, wherein the back-off time determination portion determines the first waiting time until the transaction is re-executed based on a random value between a predetermined upper limit value and a predetermined lower limit value.

3. The transaction concurrent execution control system according to claim 1, further comprising:
a transaction priority determination portion determining an execution priority of the transaction; and
a time interval determination portion determining a time interval up to re-execution of the transaction based on the execution priority,
wherein the back-off time determination portion adjusts the first waiting time until the transaction is re-executed based on the time interval.

4. The transaction concurrent execution control system according to claim 3, wherein the back-off time determination portion determines the first waiting time until the transaction is re-executed to be a value of adding a random value between a predetermined upper limit value and a predetermined lower limit value to the time interval, when the commitment of the transaction has failed.

5. A transaction concurrent execution control method for carrying out a control of concurrently executing a transaction, the method comprising:
executing the transaction;
determining a first waiting time until the transaction is re-executed when a commitment of the transaction has failed;
causing the transaction to stand by for re-execution until the first waiting time has elapsed when the commitment of the transaction has failed, wherein the control of concurrently executing the transaction is based on an optimistic lock; and
measuring an execution time from a starting of a transaction execution to an ending of the transaction execution by a transaction execution time measuring portion,
wherein, in the determining of the first waiting time, the first waiting time is a time until the transaction is re-executed at a next time and is a value of subtracting the execution time from a second waiting time calculated at a previous time, when a commitment of re-executing the transaction has failed.

6. A non-transitory computer-readable medium storing a program comprising instructions for causing a computer to function as a transaction concurrent execution control device carrying out a control of concurrently executing a transaction, the program causing the computer to function as:
a transaction execution portion executing the transaction;
a back-off time determination portion determining a first waiting time until the transaction is re-executed when a commitment of the transaction has failed;
a transaction pooling portion causing the transaction to stand by for re-execution until the first waiting time has elapsed when the commitment of the transaction has failed, wherein the control of concurrently executing the transaction is based on an optimistic lock; and
a transaction execution time measuring portion measuring an execution time from a starting of a transaction execution to an ending of the transaction execution by the transaction execution time measuring portion,
wherein the back-off time determination portion determines the first waiting time, wherein the first waiting time is a time until the transaction is re-executed at a next time and is a value of subtracting the execution time from a second waiting time calculated at a previous time, when a commitment of re-executing the transaction has failed.

* * * * *